United States Patent [19]

Smith et al.

[11] 3,744,441
[45] July 10, 1973

[54] EARTH WORKING AND PLANTING APPARATUS AND METHOD

[76] Inventors: Donald D. Smith; Richard J. O'Dowd, both of c/o Ace Industries, P.O. Box 353, Colby, Kans. 67701

[22] Filed: Sept. 27, 1971

[21] Appl. No.: 184,053

[52] U.S. Cl............................ 111/1, 111/7, 111/85, 172/156, 172/604
[51] Int. Cl.............................................. A01c 5/00
[58] Field of Search ...................... 111/1, 85, 6, 7; 172/604, 156

[56] References Cited
UNITED STATES PATENTS

| | | | |
|---|---|---|---|
| 3,491,709 | 1/1970 | Fleisher et al. | 111/85 |
| 3,556,026 | 1/1971 | Houston | 111/1 |
| 3,331,340 | 7/1967 | Tschudy, Jr. | 111/6 |
| 2,734,439 | 2/1956 | Padrick | 172/156 |
| 3,559,599 | 2/1971 | Hoadley | 111/1 |
| 1,113,241 | 10/1914 | Niesz | 172/604 X |
| 3,643,442 | 2/1970 | Houston | 111/1 |
| 2,949,871 | 8/1960 | Finn | 111/1 |
| 1,060,280 | 4/1913 | Olson | 172/604 X |

Primary Examiner—Robert E. Pulfrey
Assistant Examiner—Stephen C. Pellegrino
Attorney—Fishburn, Gold and Litman

[57] ABSTRACT

An earth working and planting apparatus for use in conservation of rainfall in semi-arid agricultural areas is disclosed which includes a mobile frame pulled by a prime mover with discs and planters arranged in a manner to cultivate the soil to form furrows with spaced interruptions on dams resulting in a series of pockets or traps to prevent errosion and in case of rain to hold water until it is absorbed by the soil and to plant seed in a plurality of rows in the beds between the pocket furrows as the pocketing and planting is performed. Planting water and pre-emergence spray may be delivered to the ground surface to aid and stimulate growth from the deposited seeds.

8 Claims, 6 Drawing Figures

INVENTOR.
Donald D. Smith and
Richard J. O'Dowd
BY
Fishburn, Gold & Litman
ATTORNEYS

EARTH WORKING AND PLANTING APPARATUS AND METHOD The present invention relates to earth working and planting apparatus and more particularly to an earth working and planting apparatus operative to prepare a seed bed formed to control and retain run-off water resulting from rain and melting snow on fields for growing crops, such as grain, cereal, and the like.

There is a tremendous amount of land which could be suitable for crop farming and which appears to be generally level as compared with hills and mountains. However, when considered locally, a very large portion of the land is rolling country sloping in all directions at random. Long dry spells bake the surface and harden same so that the rate of water absorption is quite low. When sudden hard showers do occur, most of the water runs downhill unchecked and is largely unabsorbed, eventually finding its way into streams and being lost to the land on which it fell. Shallow downhill depressions rapidly become gullies which drain the adjacent land even more rapidly. Frequently snow melts very rapidly and the water formed thereby is lost in the same way.

Contour plowing is one remedy for this situation, but is has disadvantages, more particularly, it is difficult and expensive because the contour lines must be maintained with great accuracy with respect to altitude because furrows which slope continually for any appreciable distance become water courses during a heavy rain and the water at the low points overflows and goes downhill making new gullies.

Another remedy is known as pocket or pit digging wherein a multitude of lines or rows of pockets are formed to trap and hold the water running into individual pockets to thereby positively trap and retain practically the entire rainfall with minimum of runoff with minimum disturbance of soil in preparation of a seed bed or area thereby providing a field configuration adapted to control and retain runoff water.

The principal objects of the present invention are: to provide an earth working and planting apparatus operative to effect a substantial increase in crop production by stimulating plant growth, particularly in semi-arid agricultural areas; to provide such an apparatus operative to produce a seed bed configuration effective to stop water runoff and give the moisture an opportunity to soak into and be absorbed by the soil to save substantially all water falling on fields thereby making the water available to stimulate crop growth; to provide such an apparatus operative to transform non-productive fields into lush growth of crops; to provide such an apparatus operative to prepare a seed bed having miniature pits or furrows with spaced dams or dikes forming pockets therebetween to hold moisture and effect an even distribution of water; to provide such an apparatus effective for planting seed in rows straddling or centered on the rows of pockets; to provide such an apparatus having means thereon for spraying a pre-emergence weed spray on the ground surface rearwardly of the earth working and planting structure and across the width of the path of said apparatus; to provide such an apparatus with structure to eject water with seeds during planting of same; and to provide such an earth working and planting apparatus which is durable in construction, positive in operation, economical to manufacture, and particularly well adapted for the proposed use.

Other objects and advantages of this invention will become apparent from the following description taken in connection with the accompanying drawings wherein are set forth by way of illustration and example, certain embodiments of this invention.

Figure 1:
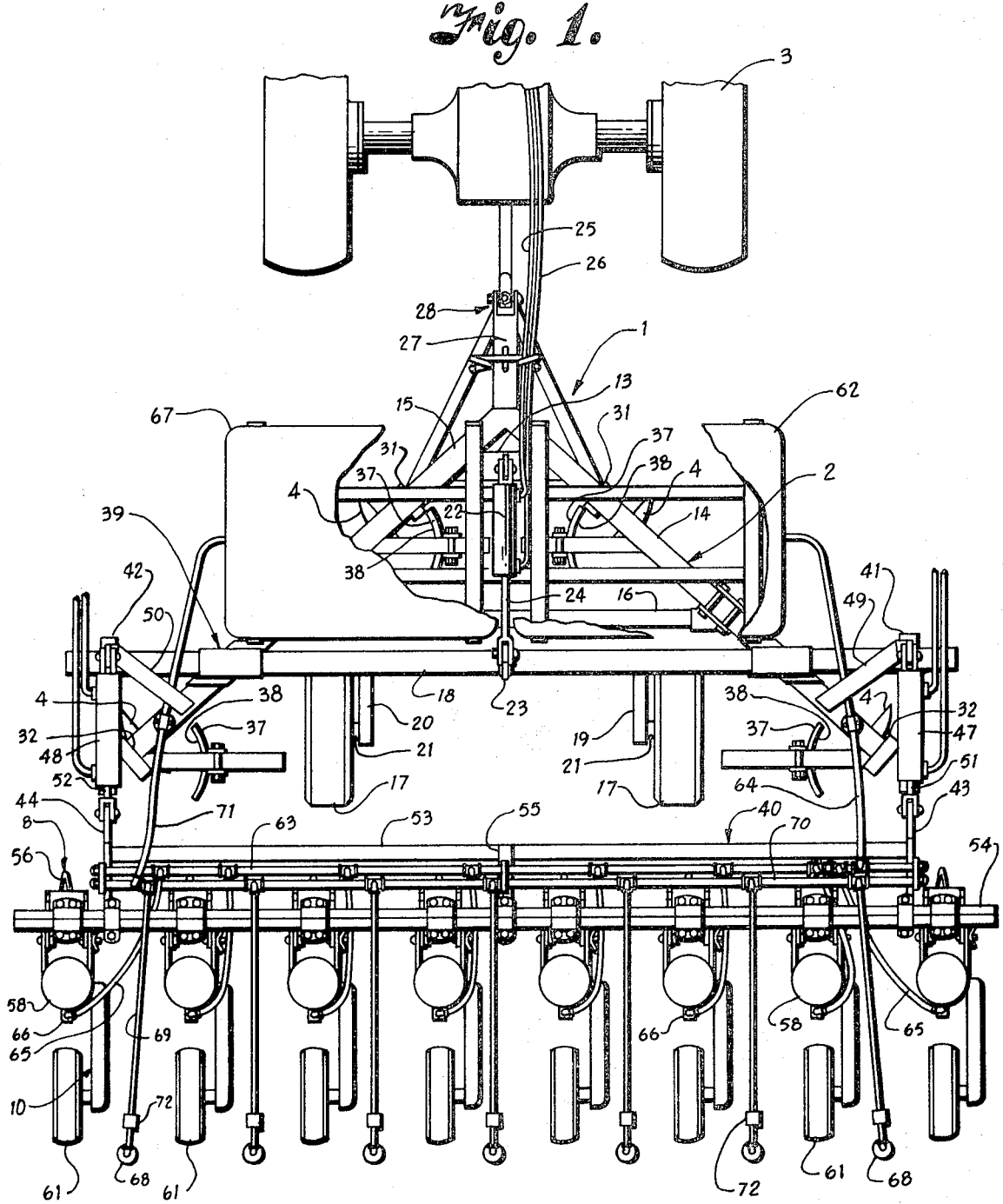
FIG. 1 is a plan view of an earth working and planting apparatus embodying features of the present invention.
Figure 2:
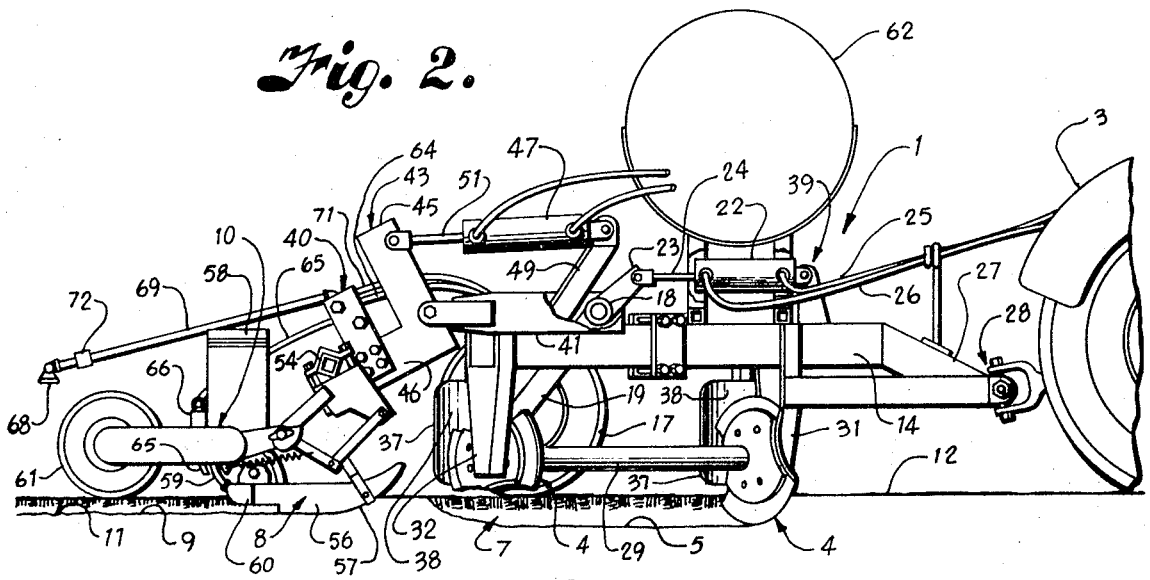
FIG. 2 is a side elevational view of the earth working and planting apparatus.
Figure 3:
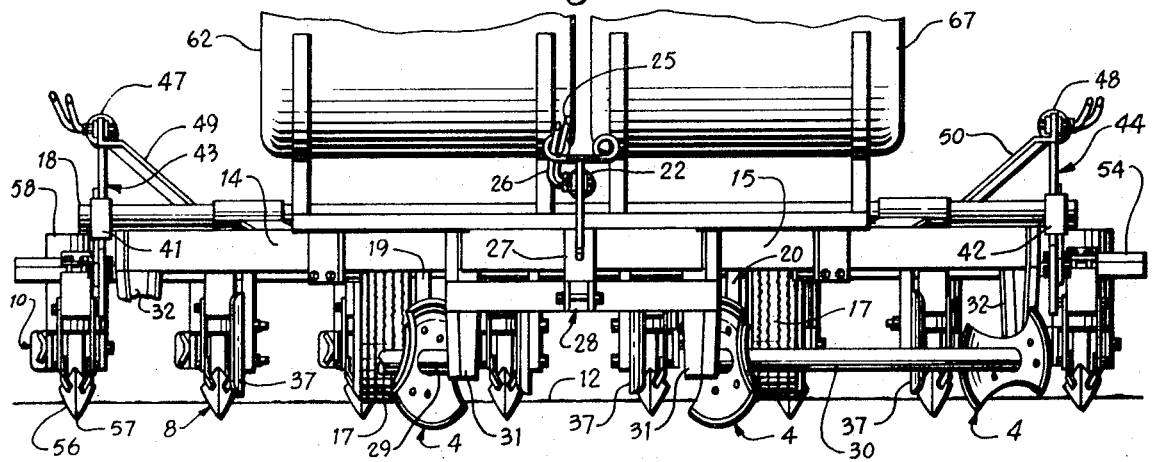
FIG. 3 is a front elevational view of the earth working and planting apparatus showing lateral positioning of earth working and planting elements.
Figure 6:
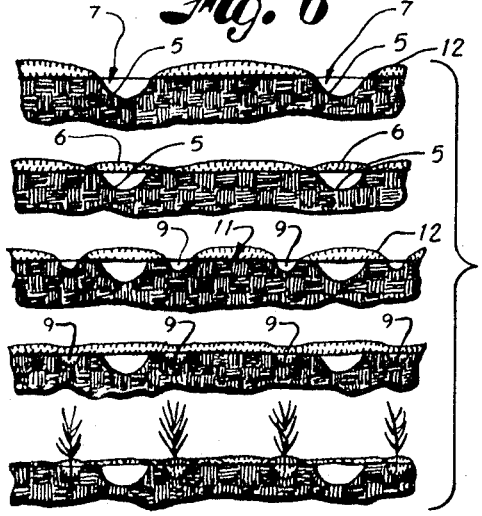
FIG. 6 is a diagrammatic view showing the sequence of earth working and planting operations.
Figure 4:
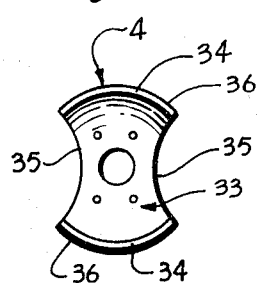
FIG. 4 is an enlarged fragmentary front elevational view of a cutter for digging a row of longitudinally spaced pits.
Figure 5:
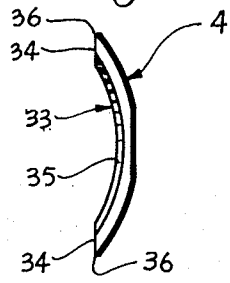
FIG. 5 is an enlarged fragmentary side elevational view of the cutter.

Referring more in detail to the drawings:

As required, detailed embodiments of the invention are disclosed herein, however, it is to be understood that the embodiments are merely exemplary of the invention which may be embodied in many forms that are different from those illustrative embodiments presented herein. Therefore, specific structural and functional details disclosed herein are not to be interpreted as limiting, but merely as a basis for the claims actually defining the scope of the invention. In this regard it is to be recognized that earth working and planting apparatus in accordance herewith may be embodied in various forms having various mobile supports and controls and furthermore that such structures may be variously actuated, leveled, and adjusted, however, the disclosure hereof is presented only as a representative basis for teaching one skilled in the art to variously employ the present invention in virtually any appropriate detailed structure.

The reference numeral 1 generally designates an earth working and planting apparatus for use in conservation of rainfall in agricultural areas and which includes a mobile frame 2 having discs and planters arranged in a manner to cultivate the soil to form furrows with spaced interruptions or dams resulting in a series of pockets or traps to prevent errosion and in case of rain to hold water until it is absorbed by the soil and to plant seed in a plurality of rows in the beds between the pocket furrows as the pocketing and planting is performed. Planting water and pre-emergence weed spray may be delivered to the soil to aid and stimulate plant growth from the deposited seeds.

In the illustrated embodiment, the mobile frame 2 of the earth working and planting apparatus 1 is pulled by a prime mover 3 to thereby operate a plurality of pit diggers 4 which are operative to form a plurality of longitudinally separated water receiving and retaining traps or pits 5 and dikes 6 positioned therebetween arranged in laterally or transversely spaced rows 7. Planting elements including seed furrow opening devices 8 are operative to open a plurality of seed furrows 9 shaped to receive seed from a respective seed dispensing and furrow closing unit 10. Planting water may be delivered to a seed bed 11 prepared in a ground surface 12 after earth working operations to aid plant growth from the deposited seeds.

The mobile frame 2 may be formed in any desired shape, such as generally square, rectangular, triangular, or the like, with suitable members secured together to form a rigid frame movable over the ground surface 12 and providing support for the soil cultivating and planting elements. The illustrated mobile frame 2 includes a front or forward member 13 and a pair of side members 14 and 15 secured thereto and extending rearwardly therefrom and a rear member 16 extending between and secured to the side members 14 and 15.

The frame 2 has a plurality of spaced ground engaging wheels 17 for movably supporting the frame 2 and ground or earth working elements thereon for generally forward movement over the ground surface 12 to prepare the seed bed 11 therein. Raising and lowering of the frame 2 is desired to selectively move the ground or earth working elements into and out of soil cultivating or earth working position, therefore, an elongated shaft 18 is rotatably mounted on the frame 2 and has the wheels 17 rotatably mounted thereon and positioned at respective opposite ends of the elongated shaft 18. In the illustrated frame, arms 19 and 20 depend from adjacent respective opposite ends of the elongated shaft 18 and each have a suitable axle 21 mounted adjacent a lower end and extending outwardly therefrom for rotatably mounting a respective wheel 17.

Rotation of the elongated shaft 18 is effective to selectively raise and lower the frame 2 and the soil cultivating or earth working elements or members and planting elements thereon. In the illustrated structure, a suitable extensible member 22 has one end thereof pivotally secured to the forward or front member 13 of the frame 2 and the other end is pivotally connected to an ear 23 extending from the elongated shaft 18 whereby extension and retraction of the extensible member 22 is effective to rotate the elongated shaft 18 and the arms 19 and 20 to thereby selectively raise and lower the frame 2 to move the soil cultivating or earth working elements or members and planting elements into and out of an earth working and planting position.

The extensible member 22 is illustrated as a hydraulic cylinder having a suitable piston movable therein to extend and retract a piston rod 24 in response to communication of a suitable hydraulic fluid to the cylinder adjacent opposite ends thereof. The hydraulic cylinder is connected in a conventional manner, as by suitable hydraulic lines 25 and 26 adjacent respective opposite ends thereof to a source of hydraulic power, such as a hydraulic pressure system, on the prime mover 3 which is under control of the operator thereof.

The earth working and planting apparatus may be selfpropelled or pulled by a suitable prime mover. When pulled by a prime mover, the mobile frame 2 includes a tongue structure 27 having a suitable hitch 28 mounted on a forward end thereof for effecting connection of the tongue structure 27 and mobile frame 2 to the prime mover 3. The hitch 28 is preferably pivotally mounted on a forward end of the tongue structure 27 to thereby permit relative movement between the frame 2 and prime mover 3.

The pit diggers 4 are mounted on the mobile frame 2 and are operative, when moved over the ground surface 12, to form or dig a plurality of transversely or laterally spaced rows of longitudinally separated water receiving pits with pits in adjacent rows being staggered and to place the dirt or soil mass from each pit in a dike or dam extending longitudinally between a pit and the next pit to be dug to thereby divert rain water into the pits.

In the form of the invention presently preferred, the pit diggers 4 are basically cultivator type discs, as later described, each having at least one cutting portion or cutting edge on the periphery thereof and extending radially farther from the axis than the remaining portion of the periphery whereby in rotating rolling motion during forward translation each cultivator disc will alternately dig pits and clear the ground surface 12. The cultivator discs or blades are preferably identical and are mounted on rotatable shafts arranged in a generally horizontal plane and in directions diagonal to the path of travel of the mobile frame 2.

In the illustrated structure, a pair of generally horizontal shafts 29 and 30 are rotatably mounted on the frame 2 with the shafts 29 and 30 extending diagonally to a fore and aft axis of the frame 2 and diverging from each other at substantially equal angles to the frame axis. The illustrated mounting of the shafts 29 and 30 includes forward and rear brackets 31 and 32 respectively depending from each of the side members 14 and 15 for rotatably supporting the shafts 29 and 30 as in suitable bearings (not shown) therein.

The pit diggers 4 are illustrated as a plurality of spaced cutters secured on each of the shafts 29 and 30 and each of the cutters are dished members having a concave face 33 and one or more cutting portions 34 on the periphery thereof with the cutting portions 34 alternating with clearance portions 35. In the illustrated structure, each of the cutters is a concavo-convex member having a pair of diametrically opposed cutting portions 34 and diammetrically opposed clearance portions 35 therebetween. The cutting portions 34 each have a cutting edge 36 for effectively penetrating the soil.

The cutters are arranged on each of the shafts 29 and 30 in a manner to dispose the cutting portions 34 of one cutter in transverse alignment with the clearance portions 35 of an adjacent cutter whereby when the cutters are operated over the soil, they function to form the spaced rows 7 each having alternately spaced interruptions thereby defining a series of the pits 5 in the form of pockets or traps thereby providing minature pits or reservoirs for retaining therein percipitation and rain water and also to effect accumulation of soil discharged therein by relatively high and dry winds.

The pockets or pits 5 are arranged in the rows 7 and the dikes 6 alternate with and are spaced from the pockets or pits 5 in each respective row 7. The cutting portions 34 are of sufficient size to collect and carry forward a major portion of the mass of material displaced by the respective cutting portion 34 during the pit digging phase and the cutting portions 34 deposit the respective mass of material on the ground surface 12 in a line spaced from and parallel with the line of pockets or pits 4 during a non-digging phase of the respective cutter to thereby produce the dikes 6 extending across a gap from one pit to the next in each of the rows 7 and having ends of the dikes overlapping respective ends of adjacent pits 5 to direct runoff water into the pits 5.

The dikes 6 formed with the cultivator type discs are longitudinally aligned in rows each adjacent and substantially parallel with the respective rows 7 of pits 5. When planting crops between the rows 7 of pits 5 and the rows of dikes 6, it is preferred that the dikes 6 be formed within the rows 7 of pits 5 to thereby provide maximum area for seed rows between adjacent rows 7 of pits 5 and dikes 6. Therefore, material to form the dikes 6 must be moved from adjacent and parallel with the respective pits to a position in alignment therewith and in the illustrated structure, a dished member 37 is positioned adjacent and rearwardly of each of the pit diggers 4. Each of the dished members 37 has a concave face 38 thereof positioned to oppose the concave face 33 of the respective cultivator type discs.

The planting elements are preferably mounted on the frame 2 in a manner to permit same to be moved into and out of planting position when the pit diggers 4 and dished members 37 are in earth working position, therefore, the mobile frame 2 has a forward portion 39 and a rear portion 40 with the shafts 29 and 30 and the pit diggers 4 and the dished members 37 being mounted on the forward portion 39 and the seed furrow opening devices 8 and the seed dispensing and furrow closing unit 10 being mounted on the rear portion 40.

In the illustrated structure, the rear portion 40 is pivotally mounted on the forward portion 39 of the mobile frame 2 and extends rearwardly of the pit diggers 4 and the dished members 37 to thereby support the planting elements for movement into and out of planting position.

Arms 41 and 42 extend rearwardly from respective opposite ends of the elongated shaft 18 and have bell cranks 43 and 44 respectively pivotally mounted thereon. The bell cranks 43 and 44 are illustrated as L-shaped members each having a generally upwardly directed arm or leg 45 and a generally rearwardly directed arm or leg 46. The bell cranks 43 and 44 are pivotally mounted on the arms 41 and 42 respectively with the pivot point being adjacent the intersection of the arms or legs 45 and 46 whereby pivoting the bell cranks 43 and 44 about the ends of the arms 41 and 42 is effective to raise and lower the rear portion 40 of the mobile frame 2.

Pivotal movement of the bell cranks 43 and 44 is effected by suitable extensible members 47 and 48 respectively, each having one end thereof pivotally mounted on an upper end of the respective upwardly directed arms or legs 45 and the other end pivotally connected to respective standards 49 and 50 extending upwardly from the side members 14 and 15 respectively. The extensible members 47 and 48 are operative by retraction to raise the rear portion 40 of the mobile frame 2 and by extension to lower the same to thereby move planting elements into a seed planting position.

The extensible members 47 and 48 are illustrated as hydraulic cylinders each having a suitable piston movable therein to extend and retract piston rods 51 and 52 respectively in response to communication of a suitable hydraulic fluid to the respective cylinder adjacent opposite ends thereof. The hydraulic cylinders are connected in a conventional manner by suitable hydraulic lines adjacent respective opposite ends thereof to a source of hydraulic power, such as a hydraulic pressure system on the prime mover 3 which is also under control of the operator thereof. The hydraulic lines communicating with the extensible members 47 and 48 are so connected to the source of hydraulic power that the rear portion 40 of the mobile frame 2 may be selectively raised and lowered independently of the raising and lowering of the forward portion 39 of the mobile frame 2.

The rear portion 40 is illustrated as including front and rear members 53 and 54 respectively extending between and suitably supported on and secured to the rearwardly directed arms or legs 46 of the bell cranks 43 and 44 with suitable bracing members 55 extending therebetween to thereby form a substantially rigid structure.

The illustrated planting elements or members include a plurality of the seed furrow opening devices 8 mounted on the rear portion 40 of the frame 2 and movable therewith. The seed furrow opening devices 8 are spaced along the rear member 54 of the rear portion 40 and each includes a plurality of laterally spaced blade-like members 56 each having an elongated cutting edge 57 extending substantially parallel with the fore and aft axis of the mobile frame 2 and effective to form relatively narrow slit-like openings or furrows 9 in the ground surface 12 after the rows 7 of the pits 5 and dikes 6 are formed therein to thereby prepare the seed bed 11 in preparation for depositing seeds therein.

The cutting edges 57 are positioned to open a pair of laterally spaced seed furrows 9 between adjacent rows 7 of pits 5 whereby each of the rows 7 of pits 5 is substantially centered between a pair of seed furrows 9 thereby providing moisture for plants adjacent and on opposite sides of each row of pits.

Seed dispensing means are mounted on the rear portion 40 and are operative for depositing seeds in the seed furrows 9. In the illustrated structure, a seed container 58 is positioned adjacent and above each of the blade-like members 56 and includes a suitable seed tube 59 having a planting shoe 60 on a lower end thereof with each planting shoe 60 being aligned with a respective cutting edge 57 and positioned rearwardly thereof. The seed containers 58 and the respective tube 59 and planting shoe 60 are operative to deposit seeds in selected longitudinal spacing along the respective seed furrow 9 with the seeds being precisely spaced and positioned in the seed furrow, as for example having the crown thereof upwardly directed.

The illustrated seed dispensing and furrow closing units 10 each include a press wheel 61 and travel of the press wheel 61 along the ground surface 12 is operative to close the respective seed furrow 9 and to effect the movement of seed from the respective container 58 and through the tube 59 and planting shoe 60 into the respective seed furrow 9, for example, through suitable sprockets mounted on the press wheel and a seed dispensing device mounted on the seed container and a chain extending therebetween. There is a press wheel 61 for each seed furrow 9 with the press wheel 61 being operative to close the respective seed furrow 9 and cover the seed therein and pack soil around the seeds whereby the press wheels 61 each trail in alignment with respective planting shoes 60 to aid in covering and pressing the soil around the seeds.

Placing water with or on the seeds deposited in the seed furrows 9 has been found to aid germination of the seed and to produce healthy plants, therefore, a liquid reservoir 62 is mounted on the mobile frame 2 and preferably on the forward portion 39 and is adapted to contain a supply of planting water. The planting water is conveyed to a position rearwardly of each planting shoe 60 for ejecting water during or immediately after depositing of the seeds. A conduit or pipe manifold 63 provides communication with the reservoir 62 by a flexible tube 64 and a plurality of tubes 65 are connected to the manifold 63 and are positioned to have a tube 65 aligned with and trailing each planting shoe 60. The tubes 65 each have a suitable valve 66 therein for periodically ejecting water into the respective seed furrow 9 to provide initial moisture for germination of the respective seeds to thereby aid plant growth from the seeds. The valves 66 are preferably actuated by travel of the respective press wheels 61 in coordinated operation with placing or depositing of the seeds in the seed furrows 9, as by a suitable trip mounted on a chain extending between sprockets on each press wheel and the respective seed dispensing device or by a cam on the seed dispensing devices.

Control of weed growth in the seed bed 11 has been found to increase the vigor of the selected crop planted therein, therefore, a liquid tank 67 is mounted on the mobile frame 2 and is preferably on the forward portion 39 adjacent the water reservoir 62. The liquid tank 67 is adapted to contain suitable weed control materials, such as a pre-emergence weed spray, for application on the ground surface of the seed bed 11 and rearwardly of the furrow closing press wheels 61. In the structure illustrated, there are a plurality of spray nozzles 68 mounted in laterally spaced-apart relation at the rear of the rear portion 40 of the frame 2 to spray the top of the soil across the path of travel of the implement with a pre-emergence weed killer after the seeds have been covered by the press wheels 61.

The spray nozzles 68 are connected by flow lines 69 to the reservoir or tank 67. Each of the flow lines 69 is connected to a suitable header line 70 communicating with the reservoir or tank 67 through a suitable flexible line or tube 71 to permit the rear portion 40 to be selectively raised and lowered. A suitable valve 72 is arranged in each of the flow lines 69 to control the flow therethrough and it is preferred that the valves 72 each be of a solenoid-actuated type whereby they may be remotely controlled from the prime mover 3 to spray the ground surface as the earth working and planting apparatus 1 moves thereover after the seeds are covered by the press wheels 61.

In using an earth working and planting apparatus constructed as described and illustrated, the prime mover 3 pulls or moves the earth working and planting apparatus 1 to the specific field for transforming same into a seed bed 11. The extensible member 22 is operated to lower the frame 2 and move the pit diggers 4 into earth workihg engagement with the ground surface of the selected field whereby forward movement of the prime mover 3 effects rotation of the horizontal shafts 29 and 30 to alternately move the cutting portions 34 and the clearance portions 35 into and over the ground surface 12 respectively with the cutting portions 34 progressively moving laterally a mass of material displaced from each pit as the cutting portions 34 move through the ground surface of the field and the mass of material is displaced during the time each clearance portion 35 is above the ground surface of the field to thereby form or produce a dike 6 spaced from and parallel with the pits 5 and extending across a gap from one pit to the next in each of the transversely spaced rows 7. The dished members 37 move a portion of the material forming the dikes 6 to a position in longitudinal alignment with the pits 5 to thereby permit the rows of pits and dikes to be spaced closer together and have a maximum portion of the field available for the seed bed 11. After the pit diggers 4 are in proper position, the rear portion 40 is moved to a planting position having the blade-like members 56 of each of the seed furrow opening devices 8 in position to cut the seed furrows 9 with the press wheels 61 moving along the ground surface 12 of the field to effect discharge or dispensing of seed from the containers 58 through the planting shoes 60 and to close the respective seed furrow 9. Travel of the press wheels over the ground surface 12 of the respective field is also operative to activate the valves 66 to permit planting water to flow from the reservoir 62 through the respective tubes 65 and into the seed furrows 9 after the seeds have been deposited therein. The valves 72 are opened or activated by the operator of the prime mover 3 to permit the pre-emergence weed spray to be ejected or delivered onto the soil of the seed bed 11 and the pits 5 and dikes 6 all rearwardly of the rear portion 40 and the press wheels 61.

The finished seed bed 12 provides an area around each of the pits which slopes toward the respective pit 5 whereby rain and like run-off water will enter the pits and be retained therein. The pits 5 are each deep enough that water retained therein penetrates deeply into the soil and provides moisture for the roots of plants adjacent the pits 5.

It is to be understood that while we have illustrated and described one form of our invention, it is not to be limited to the specific form or arrangement of parts herein described and shown.

What we claim and desire to secure by Letters Patent is:

1. An earth working and planting apparatus comprising:
   a. a mobile frame movable over a ground surface;
   b. means on said mobile frame for digging longitudinally spaced pits in laterally spaced rows;
      1. said pit digging means comprises at least one elongated shaft rotatably mounted on said mobile frame and having a plurality of spaced cutters secured thereon for rotation therewith;
      2. each of said cutters are dished members having a concave face and at least one cutting portion and one clearance portion alternately positioned on the periphery thereof;
      3. said elongated shaft and said dished members mounted thereon are positioned to progressively move laterally a mass of material displaced from each pit as said pit digging means moves along the ground surface;
   c. means on said mobile frame and spaced from said pit digging means for opening at least one seed furrow between adjacent rows of pits; and
   d. means on said mobile frame and spaced from said seed furrow opening means for dispensing seeds in the seed furrows and for closing same over the seeds.

2. An earth working and planting apparatus as set forth in claim 1 including means mounted on said frame and spaced from said pit digging means to collect and carry forward a major portion of the mass of material as said pit digging means displaces same during the pit digging phase for depositing said mass on the ground surface in a line during a non-digging phase of said pit digging means to thereby produce a dike extending across a gap from one pit to the next, said dikes being longitudinally aligned with the pits in each of said rows of pits.

3. An earth working and planting apparatus as set forth in claim 2 wherein:
 a. said dike forming means comprise a dished member adjacent and rearwardly of each of said cutters; and
 b. said dished members each have a concave face thereof opposing the concave face of the respective cutter disc.

4. An earth working and planting apparatus comprising:
 a. a mobile frame movable over a ground surface and having a fore and aft axis;
 b. a pair of generally horizontal shafts rotatably mounted on said mobile frame, said shafts being on opposite sides of the fore and aft axis of said mobile frame and each extending diagonally thereto and diverging from each other at substantially equal angles to said frame axis;
 c. means mounted on each of said shafts and movable therewith for digging longitudinally spaced pits in laterally spaced rows;
 d. a plurality of seed furrow opening devices mounted on said frame and positioned to open a plurality of laterally spaced seed furrows each substantially parallel to the fore and aft axis of said mobile frame, said seed furrow opening devices being positioned to open at least one seed furrow between adjacent rows of pits;
 e. seed dispensing means on said mobile frame and spaced from said seed furrow opening devices for depositing seeds in the seed furrows;
 f. means on said mobile frame and spaced from said seed dispensing means for closing said seed furrows after the seeds are deposited therein;
 g. said mobile frame has a forward portion and a rear portion;
 h. said rear portion is pivotally mounted on said forward portion for raising and lowering of said rear portion relative to said forward portion and said ground surface;
 i. said horizontal shafts and said pit digging means thereon are mounted on said forward portion of said mobile frame;
 j. said seed furrow opening devices and said seed dispensing means and said seed furrow closing means are mounted on said rear portion of said mobile frame; and
 k. said forward portion and said rear portion of said mobile frame have means operatively connected thereto for selectively moving said seed furrow opening devices and said seed dispensing means and said seed furrow closing means into and out of a working position.

5. An earth working and planting apparatus as set forth in claim 4 including:
 a. means mounted on said front portion of the frame for containing a supply of planting water;
 b. means communicating with said water containing means and extending to the rear portion of the frame to adjacent the seed dispensing means and selectively operable for ejecting water into said seed furrows during dispensing of said seeds in said seed furrows;
 c. means mounted on said front portion of the frame for containing a supply of pre-emergence weed spray; and
 d. means communicating with said weed spray containing means and extending to the rear portion of the frame behind the furrow closing means and selectively operable for spraying pre-emergence weed spray on the ground surface rearwardly of said furrow closing means.

6. A method of earth working and planting comprising:
 a. digging longitudinally spaced pits in laterally spaced rows in a ground surface to be planted, said digging of said rows of pits includes:
  1. displacing a mass of material during digging said pits;
  2. progressively moving laterally the mass of material during digging said pits and positioning the mass of material between and sloping toward adjacent rows of pits;
  3. collecting and carrying forward a portion of the mass of material moved laterally;
  4. depositing the collected portion of the mass of material on the ground surface to be planted in a line to form a dike extending across each gap from one pit to the next whereby said pits and dikes in each row are longitudinally aligned;
 b. opening at least one seed furrow between adjacent rows of pits;
 c. depositing seeds in the seed furrows; and
 d. closing the seed furrows over seed therein.

7. A method of earth working and planting as set forth in claim 6 wherein a pair of laterally spaced seed furrows are opened between adjacent rows of pits after said dikes are formed.

8. A method of earth working and planting as set forth in claim 7 and including:
 a. ejecting planting water into the seed furrows during depositing of said seeds in the seed furrows;
 b. spraying pre-emergence weed spray on the ground surface after the seed furrows are closed.

* * * * *